US008230327B2

(12) United States Patent
Raja et al.

(10) Patent No.: US 8,230,327 B2
(45) Date of Patent: Jul. 24, 2012

(54) IDENTIFYING STATEMENTS REQUIRING ADDITIONAL PROCESSING WHEN FORWARDING A WEB PAGE DESCRIPTION

(75) Inventors: Nagendra Kumar Raja, Karnataka (IN); Thomas R. Mueller, Fremont, NE (US); Sanjib Ghosh, Karnataka (IN)

(73) Assignee: Oracle America, Inc., Redwood City, CA (US)

( * ) Notice: Subject to any disclaimer, the term of this patent is extended or adjusted under 35 U.S.C. 154(b) by 2284 days.

(21) Appl. No.: 10/376,302

(22) Filed: Mar. 3, 2003

(65) Prior Publication Data

US 2004/0177318 A1    Sep. 9, 2004

(51) Int. Cl.
*G06F 17/00* (2006.01)

(52) U.S. Cl. ........ 715/234; 715/235; 715/236; 715/237; 715/238; 715/239; 715/240; 715/241; 715/242; 715/243; 715/255

(58) Field of Classification Search .......... 715/513–517, 715/530
See application file for complete search history.

(56) References Cited

U.S. PATENT DOCUMENTS

| | | | | |
|---|---|---|---|---|
| 6,341,353 | B1 * | 1/2002 | Herman et al. ............... | 713/201 |
| 7,111,243 | B1 * | 9/2006 | Ballard et al. ................ | 715/744 |
| 2001/0034771 | A1 * | 10/2001 | Hutsch et al. ................ | 709/217 |
| 2002/0013792 | A1 * | 1/2002 | Imielinski et al. ........... | 707/523 |
| 2002/0055924 | A1 * | 5/2002 | Liming ......................... | 707/100 |
| 2002/0073043 | A1 * | 6/2002 | Herman et al. ............... | 705/64 |
| 2002/0091738 | A1 * | 7/2002 | Rohrabaugh et al. ......... | 707/517 |
| 2002/0099738 | A1 * | 7/2002 | Grant ............................ | 707/513 |
| 2002/0143659 | A1 * | 10/2002 | Keezer et al. ................. | 705/27 |
| 2003/0028451 | A1 * | 2/2003 | Ananian ....................... | 705/27 |
| 2003/0056173 | A1 * | 3/2003 | Copenhaver et al. ......... | 715/513 |
| 2003/0115247 | A1 * | 6/2003 | Simpson et al. .............. | 709/200 |
| 2004/0102197 | A1 * | 5/2004 | Dietz ............................ | 455/456.1 |
| 2004/0177318 | A1 * | 9/2004 | Raja et al. .................... | 715/501.1 |
| 2004/0230661 | A1 * | 11/2004 | Rashid et al. ................ | 709/207 |
| 2005/0097008 | A1 * | 5/2005 | Ehring et al. ................. | 705/26 |

OTHER PUBLICATIONS

Eirinaki, Magdalini, et al.; Web Mining for Web Personalization; Feb. 2003; ACM Press; ACM Transactions on Internet Technology (TOIT) archive, vol. 3 , Issue 1; pp. 1-27.*
Entitled, "Apache Module mod_rewrite-URL Rewriting Engine"; Available from <http://httpd.apache.org/docs/mod/mod_rewrite.html#InternalRuleset>(23 Pages).
Entitled,"Novell Documentation: Novell iChain 2.1—RewriterSupport"; Available from <http://www.novell.com/documentation/lg/ichain21/index.html?page=/documentation/lg/ichain21/ichain21/data/afaqb7s.html>, (10 Pages).

* cited by examiner

*Primary Examiner* — Cesar Paula
*Assistant Examiner* — Nathan Hillery
(74) *Attorney, Agent, or Firm* — Narendra Reddy Thappeta

(57) ABSTRACT

A system which enables an administrator to conveniently specify statements of a web page description which may require additional processing. The administrator may select from a list of statement types, and a language grammar corresponding to the selected statement type is displayed. The administrator may provide variable data associated with the fields of the displayed language grammar, and a rule instance is created from the language grammar and the variable data. An intermediate server may determine whether each statement of a web page description matches any of the rule instances. If a match is detected, the corresponding statement is determined to potentially require additional processing (such as modification of a URL in a reverse proxy server).

31 Claims, 15 Drawing Sheets

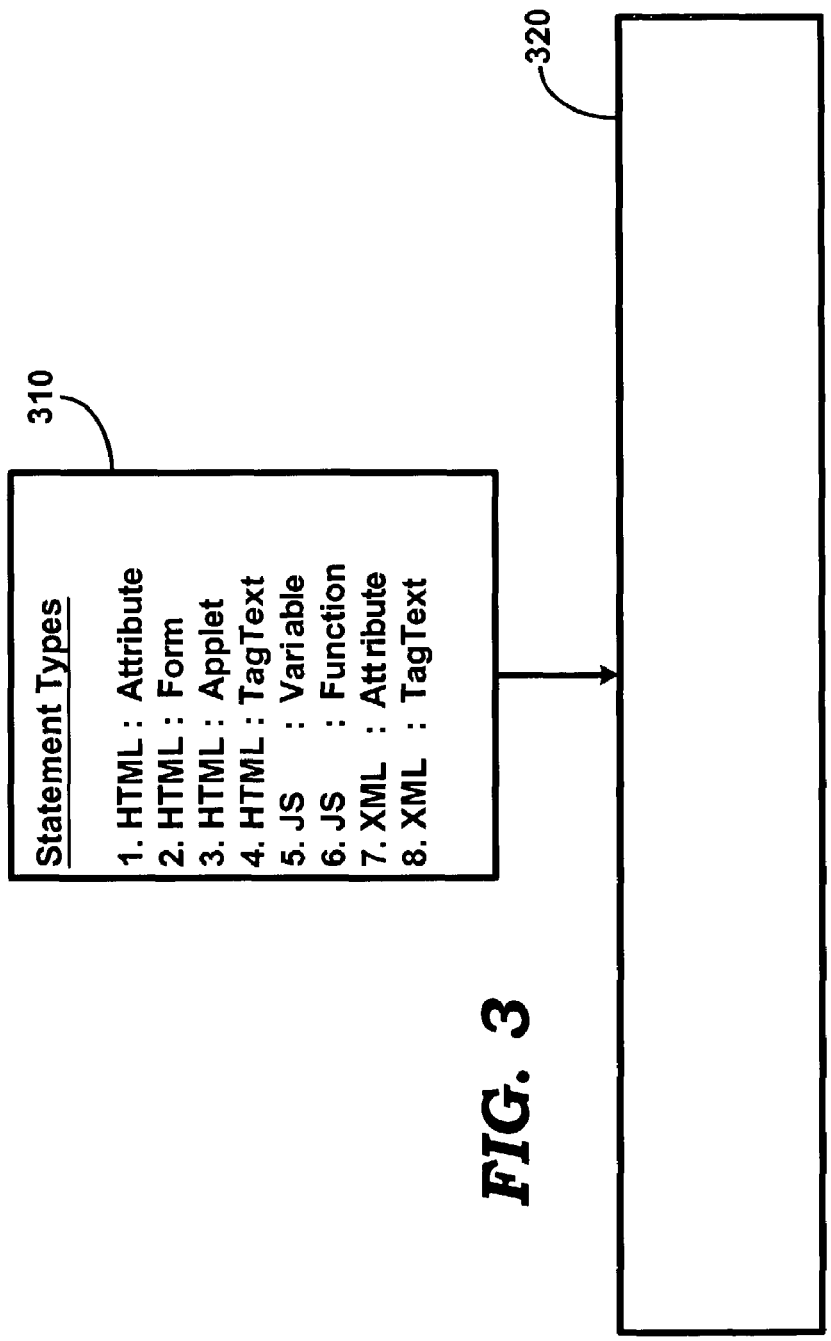

<Attribute name= "name of the attribute" [tag= "name of the tag to which attribute belongs" valuePatterns= "value pattern(s) to rewrite" type="value type(URL|DHTML|DJS)" source= "page URI" ]/>

FIG. 4A

<Form name= "name of the form" field= "name of the field" [valuePatterns= "value pattern(s) to rewrite" source= "page URI" ]/>

FIG. 4B

<Applet code= "Class name/Object CLASSID" param="name of the applet parameter" [valuePatterns= "value pattern(s) to rewrite" source= "page URI" ]/>

FIG. 4C

<TagText tag= "name of the tag" attributePatterns= "attribute and values that this tag contains" valuePatterns= "value pattern(s) to rewrite" source= "page URI" />

FIG. 4D

```
<Variable name="name of the variable" [type = "value type(URL|EXPRESSION|DHTML|DJS|SYSTEM)" source="page URI"]/>
```

FIG. 4E

```
<Function name="name of the function" paramPatterns = "which param of the function" [type = " value type(URL|EXPRESSION|DHTML|DJS)" source="page URI"]/>
```

FIG. 4F

```
<Attribute name= "name of the attribute" [tag= "name of the tag to which attribute belongs" valuePatterns = "value pattern(s) to rewrite" type="value type(URL|DHTML|DJS)" source="page URI" ]/>
```

FIG. 4G

```
<TagText tag= "name of the tag" attributePatterns= "attribute and values that this tag contains" valuePatterns= "value pattern(s) to rewrite" source= "page URI"
```

FIG. 4H

510: <Attribute name="action" source="abc.html"/>

511: <Attribute name="codebase" type="URL"/>

513: <Attribute name="href "/>

517: <Attribute name="archive" valuePatterns="*  *  *,*,*  * ,*,***"/>

519: <Attribute name="onClick*" tag="*" type="DJS"/>

*FIG. 5A*

520 : <Form name="*" field="iplanet*" valuePatterns="0|234|test|" source="*"/>

525 : <Form name="homepagedetails" field="homepage*"/>

*FIG. 5B*

530 : <Applet code="treenav*.class" param="*" source="*"/>

534 : <Applet code="Tree.class" param="*" />

538 : <Applet code="Display.class" param="directoryPath" source="*"/>

*FIG. 5C*

540 : <TagText tag="span" attributePatterns="href=*"/>

542 : <TagText tag="Attribute"/>

FIG. 5D

550: <Variable name="imgsrc" type="URL"/>

552: <Variable name="*location" type="EXPRESSION"/>

554: <Variable name="dhtmlvar" type="DHTML"/>

556: <Variable name="djsvar" type="DJS"/>

558:<Variable name="window.location.pathname" type="SYSTEM"/>

FIG. 5E

560 : <Function name = "openURL" paramPatterns= "y" type= "URL"/>

562 : <Function name="*location.replace" paramPatterns="y" type="EXPRESSION"/>

564 : <Function name="document.write" paramPatterns="y" type="DHTML"/>

566 : <Function name = "*eval" paramPatterns = "y" type = "DJS"/>

*FIG. 5F*

570 : <Attribute name="href" tag="a"/>

*FIG. 5G*

580 : <TagText tag="baseroot"/>

601 : <!ELEMENT Attribute EMPTY>

603 : <!ATTLIST Attribute

605 : name CDATA #REQUIRED

606 : tag CDATA "*"

607 : valuePatterns CDATA ""

608 : type (URL|DHTML|DJS) "URL"

609 : source CDATA "*">

FIG. 6B

610 : <!ELEMENT Form EMPTY>

612 : <!ATTLIST Form

614 : name CDATA #REQUIRED

616 : field CDATA #REQUIRED

617 : valuePatterns CDATA ""

619 : source CDATA "*">

620 : <!ELEMENT Applet EMPTY>

622 : <!ATTLIST Applet

624 : code CDATA #REQUIRED

626 : param CDATA ""

628 : valuePatterns CDATA ""

629 : source CDATA "*">

FIG. 6C

630: <!ELEMENT TagText EMPTY>

631: <!ATTLIST TagText

632: tag CDATA #REQUIRED

633: attributePatterns CDATA ""

634: source CDATA "*">

640 : <!ELEMENT Variable EMPTY>

642 : <!ATTLIST Variable

644 : name CDATA #REQUIRED

646 : type (URL|EXPRESSION;|DHTML|DJS|SYSTEM) "EXPRESSION"

649 : source CDATA "*">

FIG. 6F

650 : <!ELEMENT Function EMPTY>

652 : <!ATTLIST Function

654 : name CDATA #REQUIRED

656 : paramPatterns CDATA #REQUIRED

658 : type (URL|EXPRESSION|DHTML|DJS) "EXPRESSION"

659 : source CDATA "*">

660 : <!ELEMENT Attribute EMPTY>

662 : <!ATTLIST Attribute

664 : name CDATA #REQUIRED

666 : tag CDATA ""

667 : valuePatterns CDATA ""

668 : type (URL|DHTML|DJS) "URL"

669 : source CDATA "*">

*FIG. 6G*

670 : <!ELEMENT TagText EMPTY>

672 : <!ATTLIST TagText

674 : tag CDATA #REQUIRED

676 : attributePatterns CDATA ""

679 : source CDATA "*">

*FIG. 6H*

710 : <!ENTITY %ruleSetElements '(HTMLRules|JSRules| XMLRules)? '>

720 : <!ENTITY %htmlElements '(Form | Applet | Attribute |TagText)*'>

730 : <!ENTITY %jsElements '(Variable | Function) *'>

740 : <!ENTITY %xmlElements '(Attribute | TagText) *'>

750 : <!ELEMENT RuleSet(%ruleSetElements;,%ruleSetElements;,%ruleSetElements;)>

770 : <!ATTLIST RuleSet

780 : id ID #REQUIRED

790 : extends CDATA "NONE">

*FIG. 7*

IDENTIFYING STATEMENTS REQUIRING ADDITIONAL PROCESSING WHEN FORWARDING A WEB PAGE DESCRIPTION

BACKGROUND OF THE INVENTION

1. Field of the Invention

The present invention relates to servers processing web page description, and more specifically to a method and apparatus for enabling identification of statements requiring additional processing in a web page description.

2. Related Art

Web pages are generally provided on a web server, and can be accessed from a client system, typically using an appropriate web browser software, as is well known in the relevant arts. In general, the displayed content and the user interface provided to a user is specified by several statements, which are together referred to as a web page description. For example, some statements define the layout of the displayed content, the specific fonts used to display specific pieces of text, etc. Some other statements may define a URL to be associated with a specific piece of a displayed portion, the menus to be provided, etc.

Intermediate servers are often present in the path from a web server to the corresponding client systems, and operate to forward a web page description to (towards) the corresponding client system. Examples of such intermediate servers include reverse proxy servers, web crawler, etc., which are also well known in the relevant arts.

Web page descriptions forwarded by an intermediate server often contain statements requiring additional processing. For example, a reverse proxy server often needs to be implemented to rewrite (modify) URLs present in a web page description being sent to a client. Such a rewriting may be necessary, for example, to ensure that access to all resources using the web pages are channeled through the proxy server.

As is well known, such a feature may be used to control access (e.g., to enhance security) to various resources and to measure various metrics (e.g., number of accesses to the web page). Thus, it may be necessary to identify statements (in a web page description) requiring additional processing in intermediate web servers.

BRIEF SUMMARY

An aspect of the present invention enables a user (e.g., administrator of a intermediate server) to identify statements (of a web page description) potentially requiring additional processing. In an embodiment, a language grammar of a statement type is displayed, wherein the language grammar and the statement type are defined by a language used to specify the web page description. The user may then incorporate a variable data into the language grammar to generate a rule instance.

An intermediate server may then compare statements of a web page description with each of such rule instances. If a match is detected, the corresponding statement is determined to potentially require additional processing.

In an embodiment, the user is provided a listing of all the statement types used in a web page description. The user selects each statement type of interest. The language grammar corresponding to the selected type is displayed, and the user provides the corresponding variable data to cause the corresponding rule instance to be generated. The user may generate as many rule instances as desired.

According to another aspect of the present invention, the rule instances are stored in XML format, with each rule instance containing a field name and a field value. The field value may store the variable data entered by the user.

While the rule instances are generated, constraints may be enforced with respect to each rule instance. For example, if variable data is required for a specific field, the user may be forced to enter the corresponding data before accepting a rule instance.

In general, a designer may need to first identify the statement types in each language used to generate a web page description. In an embodiment, the web page description is provided using HTML, JavaScript (JS), and XML. Accordingly, an attribute statement type, a form statement type, an applet statement type, and a TagText statement type may be included for HTML. A variable statement type and a function statement type may be included for JS language, and a TagText statement type and an attribute statement type may be included for XML.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIG. 3 is a diagram illustrating the manner in which various statement types may be indicated and the manner in which an administrator may select one of the types to generate a rule instance;

FIGS. 4A through 4H respectively indicate a corresponding language grammar displayed when a corresponding statement type is selected;

FIGS. 5A through 5H respectively indicate a set of corresponding rule instances generated by editing a language grammar of the corresponding statement type;

FIGS. 6A through 6H respectively indicate the constraints in generating rule instances for each statement type;

FIG. 7 contains a set of definitions present in a rule set created in an embodiment of the present invention.

DETAILED DESCRIPTION

1. Overview

An aspect of the present invention provides a convenient user interface using which a user (e.g., administrator of a reverse proxy server) may specify the specific statements (of a web page description), which may require additional processing. In an embodiment, the language grammar corresponding to statement types, which may require additional processing, is displayed. A user may conveniently select a statement type of interest and edit the corresponding language grammar to specify the variable data to create a rule instance. Several such rule instances together may be used to identify all the statements requiring additional processing.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
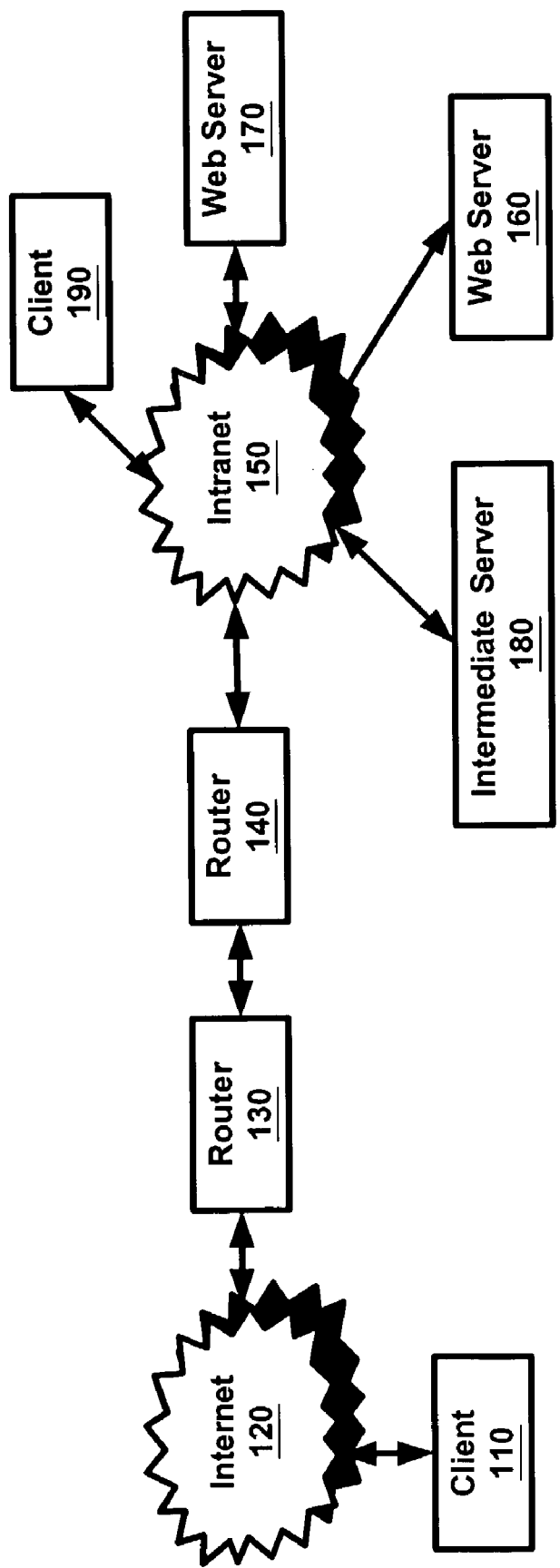
FIG. 1 is a block diagram illustrating an example environment in which the present invention can be implemented.

FIG. 1 is a block diagram illustrating an example environment in which the present invention can be implemented. The environment is shown containing clients 110 and 190, Internet 120, routers 130 and 140, intranet 150, web servers 160 and 170, and intermediate server 180. Each system is described below in further detail.

Client 190 represents a system which may be used by users (typically working for the entity operating/owning intranet 150) to access various systems (e.g., web servers 160 and 170), possibly using both intranet 150 and Internet 120. Client 110 is shown connected to Internet 120. In general, clients 110 and 190 represent systems implemented with appropriate software (e.g., browsers) enabling access to various resources on the networks. Web servers 160 and 170 represent systems providing resources which can be accessed from intranet 150 and/or Internet 120, and can be implemented in a known way.

Internet 120 generally represents a conglomeration of potentially disparate networks, as is well known in the relevant arts. Intranet 150 represents a network (or multiple networks), typically owned and/or operated by an interested entity such as a service provider or a corporation. Each of Internet 120 and intranet 150 typically contains devices such as routers, switches, bridges and repeaters, as is also well known in the relevant arts.

Routers 130 and 140 provide connectivity between Internet 120 and intranet 150, using protocols such as Internet Protocol (IP), and may thus be implemented in a known way. Often router 140 is configured to control access of various systems within intranet 150. In some situations, the domain space/name contained in a URL may itself not be accessible from outside of intranet 150.

Intermediate server 180 represents a system, which forwards web page descriptions received from web servers 160 and 170. In forwarding a web page description, intermediate server 180 may need to identify statements which require further processing. For example, assuming that intermediate server 180 represents a reverse proxy server, some of the statements containing URLs may need to be identified, and the corresponding URLs rewritten (modified).

An aspect of the present invention provides an administrator the ability to specify the specific statements which may require processing, which in turn enables intermediate server 180 to identify and process the statements easily and accurately. The manner in which the statements can be identified accurately is described below in further detail.

3. Specifying Rule Set Enabling Identification of Statements Requiring Processing FIG. 2A is a flow-chart illustrating a method using which an administrator may indicate the specific statements (of a web page description) which require additional processing. The method may be implemented in any digital processing system, even though the description is provided with reference to intermediate server 180 for illustration. However, the method may be implemented in other environments as well. The method being in step 201, in which control immediately passes to step 210.

In step 210, intermediate server 180 displays language grammar corresponding to each statement type, which may require additional processing. In an embodiment, a designer of intermediate server 180 generates a rule set containing all the types of statements, which require additional processing, and the entire rule set is displayed.

In step 220, intermediate server 180 enables an administrator to incorporate variables into the language grammar rule to create a rule instance. In an embodiment described below, a selected rule type is presented in an editable format, and the administrator inserts the appropriate variable data into the editable format to create a rule instance. Step 220 may be repeated as many times as needed (with the same or different rule type) to specify all the statements which may require additional processing.

In step 230, the rule instances created according to steps 210 and 220 are stored in intermediate server 180. The rule instances together may be conveniently referred to as a rule set. The method ends in step 234. The manner in which intermediate server 180 operates to identify statements containing URLs based on the provided rule set is described below in further detail.

4. Identifying Statements Containing URLs Using Rule Set

Figure 2B:
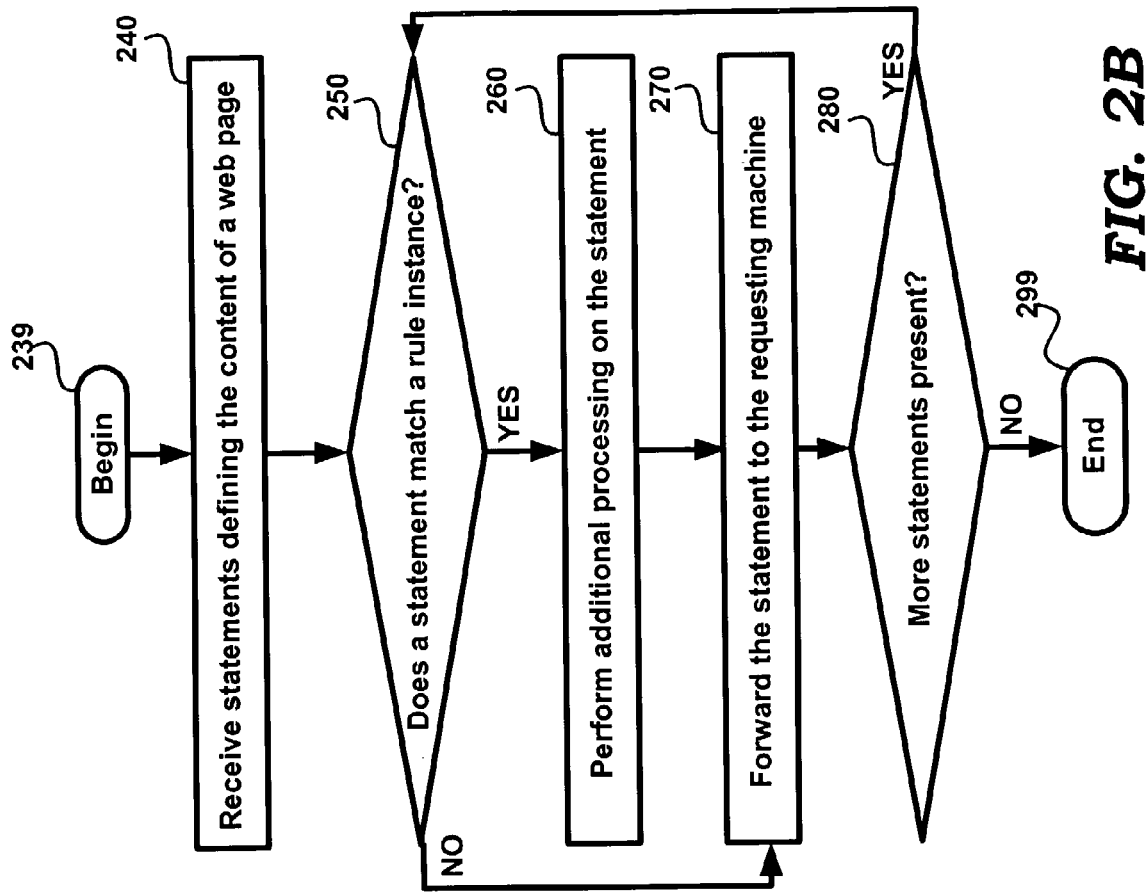
FIG. 2B is a flowchart illustrating the manner in which rule instances can be used by an intermediate server in an embodiment of the present invention.
Figure 2A:
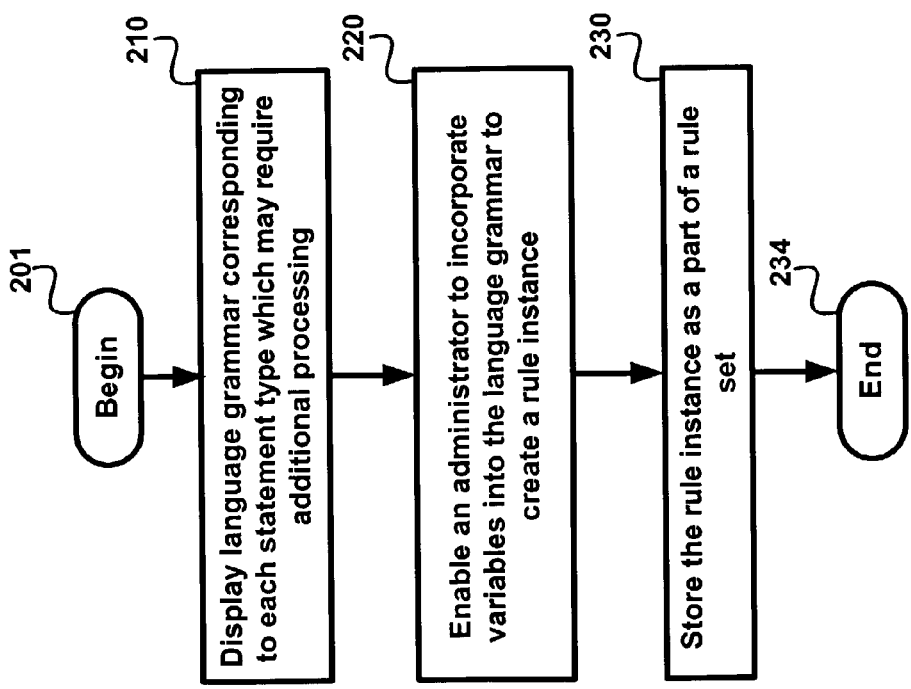
FIG. 2A is a flowchart illustrating the manner in which rule instances, which specify statements potentially requiring additional processing, can be generated in an embodiment of the present invention.

FIG. 2B is a flow-chart illustrating a method using which statements requiring additional processing may be identified in an embodiment of the present invention. The method is described with reference to FIG. 1 for illustration. However, the method may be implemented in other environments as well. The method begins in step 239, in which control immediately passes to step 240.

In step 240, intermediate server 180 receives statements (web page description) defining a web page from web server 160 or 170. The description may be received in response to a request (e.g., in the form of a URL) received earlier by the web server from client 110.

In step 250, intermediate server 180 determines whether a statement (in the web page description) matches a rule instance contained in a rule set (created, for example, according to FIG. 2A). In general, the determination of match depends on the language grammar of the statement and the rule instance, the conventions (e.g., wild card characters) used in specifying the variable data for the rule instance. Control passes to step 260 if a match is detected, and to step 270 otherwise.

In step 260, intermediate server 180 performs additional processing on the statement, for example, depending on the statement type. The implementation of such processing will be apparent to one skilled in the relevant arts. For example, in the case of a reverse proxy server, a pre-specified URL (of intermediate server 180) may be appended such that further access requests from the web page are channeled through intermediate server 180. Control then passes to step 270.

In step 270, the statement (with or without the processing of step 260) is forwarded to client 110 connected to internet 120. Several statements may be buffered and transmitted together for transmission efficiency. In step 280, intermediate server 180 determines whether additional statements are present in the web page description. Control passes to step 250 if such an additional statement is present. The loop of steps 250-270 may be performed for each statement in a web page description. The method ends in step 299.

Thus, using the approach of above, statements requiring additional processing may be easily identified. The description is continued with reference to an example embodiment implementing the approaches of above.

5. Use of Rule Types

FIG. 3 illustrates the manner in which an administrator can be provided the ability to select specific rule types. The figure is shown containing statement type box 310 and language grammar box 320. The operation and use of each box is described below in further detail.

A designer of intermediate server 180 determines all the statement types (requiring additional processing) based on an understanding of language(s) used in a web page description. In an embodiment, the web page description is based on Hyper Text Markup Language (HTML), JavaScript (JS), and eXtended Meta Language (XML). The designer is assumed to have identified four, two and two statement types (as potentially requiring additional processing) for HTML, JS and XML respectively.

Accordingly, statement type box 310 is shown listing the corresponding eight statement types, namely—(1) HTML: Attribute (i.e., Attribute statement type for HTML); (2) HTML: Form; (3) HTML: Applet; 4) HTML: TagText; (5) JS: Variable (i.e., Variable statement type for JavaScript (JS)); (6) JS: Function; (7) XML: Attribute; and (8) XML: TagText.

While all the statement types are shown displayed as a single list, the statements may be grouped hierarchically (with higher level representing group identifier and lower level containing the statement types). Other organizations may also be chosen to list the statement types. It should be understood that other statement types may also be included as felt suitable by a designer. For example, in an embodiment, a TagText and Attribute Rules is also included for XML, similar to as shown for HTML.

A user may select any of the eight statement types, and a language grammar corresponding to the selected statement type if displayed in language grammar box 320. An administrator may edit the language grammar to incorporate the variable data at the appropriate points of the language grammar. The rule instances are generated and stored based on the language grammar and the incorporated variable data. The manner in which language grammar is displayed and edited, and the manner in which the corresponding rule instance may be generated is described for each of the languages (HTML, JS and XML) in the below sections.

6. HTML

FIG. 4A depicts the content of language grammar box 320 when an administrator selects a rule entitled, "1. HTML: Attribute" (i.e., Attribute statement type of HTML language) of FIG. 3A. While the language grammar is shown displayed in text form in its entirety, other suitable interfaces may be provided, which communicate the grammar to an administrator.

Only the details of HTML as relevant to an understanding of the presented examples are described here for conciseness. For further details on HTML, the reader is referred to a book entitled, "HTML and CGI unleashed", by John December and Mark Ginsburg, ISBN: 0-672-30745-6, which is incorporated in its entirety herewith.

Continuing with reference to FIG. 4A, as may be readily appreciated, the displayed content represents the language grammar corresponding to attribute related statement type. The administrator may edit some of the displayed fields and rule instances depicted in FIG. 5A may be created.

FIG. 5A depicts rule instances which can be created by editing the content of FIG. 4A a corresponding number of times. Line 510 is created assuming that the administrator has entered (by typing the text, by selection of a menu item provided, etc.) "action" in the field shown as "Name of the Attribute". Lines 511-513 are similarly described.

Line 517 is shown containing variable data for an additional field (in comparison to lines 511-513)—valuePatterns. Similarly, line 519 contains variable data for an additional field—Tag. As may be appreciated, the two additional fields are optional. In general, the required and optional fields may be enforced using the appropriate programming techniques depending on the environment of implementation. The information of FIG. 6A can be used for such enforcement as described below.

FIG. 6A indicates the specific fields which are required and which are optional in relation to statement type 1 of FIG. 3A. As noted there, variable data is 'required' for the name-field, and optional for tag and valuePatterns fields. Accordingly, in FIG. 5A, all lines 510-513, 517 and 519 contain variable data for the name field, only line 517 contains variable data for valuePattern field and only line 519 contains variable data for the tag field.

The lines of FIG. 6A further indicate that fields entitled name, tag, valuePatterns, and source can be any character data (CDATA). The field entitled type can be one of URL, DHTML or DJS.

While FIG. 6A indicates some of the constraints (rules) which may need to be enforced, other constraints may also be enforced by using programming techniques. For example, the identifier of a field (i.e., name, tag and valuePatterns in FIG. 5A) may be forced to be in lower case in the rule instances of FIG. 5A. In addition, all required fields in a rule instance may not equal '*' (a wild card matching any character). As another example, various checks (e.g., wild-cards only where permissible, alpha-numeric constraints) can be made on variable data entered in different fields.

Similarly, FIGS. 4B-4D respectively depict the language grammar for rules 2-4 (i.e., Form statement type, Applet statement type, and TagText statement type, all of HTML language) of FIG. 3A. FIGS. 5B-5D respectively depict the rule instances created by editing the language grammar corresponding to the three rules. FIGS. 6B-6D respectively depict the field constraints for the three rules. The description is continued with reference to JavaScript (JS).

7. JavaScript (JS)

FIGS. 4E and 4F respectively depict the language grammar of variable statement type and function statement type of JavaScript (JS) language. FIGS. 5E and 5F respectively depict the instance rules which may be generated based on the language grammar depicted in FIGS. 4E and 4F.

The line in FIG. 4E indicates that a user is to select one of URL, EXPRESSION, DHTML, DJS or SYSTEM as variable data. Accordingly lines 550, 552, 554, 556 and 558 of FIG. 5E respectively depict a situation in which the user has selected each of the corresponding values (URL, EXPRESSION, DHTML, DJS and System) as variable data for the field entitled type. The lines are shown with variable data of img-src, *location, dhtmlvar, djsvar and window.location.path for name of JS Variable.

As may be appreciated the rule instance of line 554 matches a statement such as [var dhtmlVar="<a href=http://www.sun.com"] in a web page description. Line 556 similarly matches a statement such as [var dJSVar="var imgsrc='/tmp/tmp.jpg';";].

FIGS. 6E and 6F indicate the required fields for statement types of FIGS. 4E and 4F respectively. The content of FIGS. 5E, 5F, 6E and 6F may be understood similar to the corresponding Figures with relation to HTML. Only the details of JavaScript as relevant to an understanding of the presented examples are described here for conciseness. For further details on JavaScript, the reader is referred to a book entitled, "JavaScript Bible", Author: Danny Goodman, Publisher: IDG Books Worldwide, ISBN Number: 0764531883, which is incorporated in its entirety herewith.

8. XML

FIGS. 4G and 4H respectively depict the language grammar of attribute statement type and TagText statement type of XML language. Only the details of XML as relevant to an understanding of the presented examples are described here for conciseness. For further details on XML, the reader is referred to a book entitled, "XML in a Nutshell: A Desktop Quick Reference", Author: Elliotte Rusty Harold, W. Scott Means; Publisher: O'Reilly & Associates, ISBN Number: 0596000588, which is incorporated in its entirety herewith.

FIGS. 5G and 5H respectively depict the instance rules which may be generated based on the language grammar depicted in FIGS. 4G and 4H. FIGS. 6G and 6H indicate the required fields for statement types of FIGS. 4E and 4F respectively. The content of FIGS. 5G, 5H, 6G and 6H may be understood similar to the corresponding Figures with relation to HTML.

The list of rule instances described in FIGS. 5A through 5H above may be provided in the form of a file. Various grammar statements may be contained in the file, which further define the content of the file and the manner in which the rules are to be used as described below in further detail.

9. Grammar Statements Associated with Rule Instances

FIG. 7 depicts the grammar statements which may precede the rule instances of FIGS. 5A through 5H in one embodiment. Only a few grammar statements are included in FIG. 7 for conciseness. Typical rule sets contains more grammar statements. Each of the grammar statements of lines 710, 720, 730, 740, 750, 770, 780 and 790 is described in further detail below.

The grammar statement of line 710 defines a variable ruleSetElements to be one of (By virtue of '?' symbol at the end) HTMLRules, JSRules, and XMLRules. Similarly, lines 720, 730 and 740 respectively define variables htmlElements, jsElements and XmlElements to be any of (Form|Applet|Attribute|TagText), (Variable|Function), and (Attribute|TagText).

The grammar statement of line 750 provides the first hierarchy of rule sets, and indicates that rule sets follow for each of HTMLRules, JSRules, and XMLRules due to the definition of line 710. The corresponding definitions (of FIGS. 5A through 5H) may follow statement 790.

The grammar statements of lines 770 and 780 together specify a constraint requiring an administrator to provide a name (identifier) associated with each instance of the rule set file. The grammar statement of line 790 (in the context of line 770) enables other instances of rule set files to be used. The label "NONE" indicates that the present instance is not using any other rule sets as an extension. As noted above, the statements in FIGS. 5A through 5H may follow statement 790 to form the entire rule set file instance.

It should be understood that different components of the reverse proxy server 180 (and any system enabling an administrator to define the rule sets) can be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing devices with a desired mix of hardware, software and/or firmware. Embodiments implemented substantially in the form of software are described below.

9. Software Implementation

Figure 8:
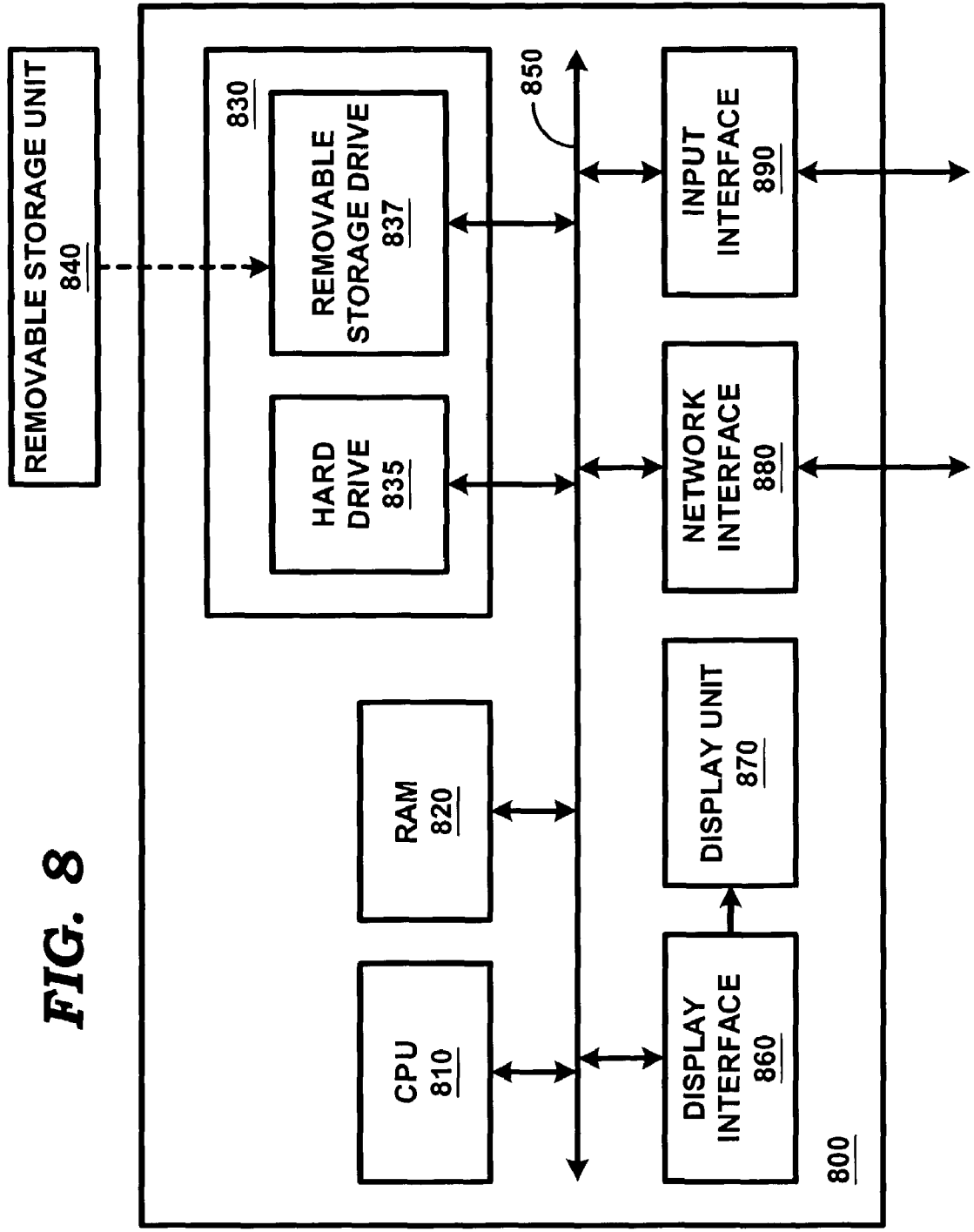
FIG. 8 is a block diagram illustrating the details of implementation of a reverse proxy server substantially in the form of software.

FIG. 8 is a block diagram illustrating the details of system 800 in one embodiment. System 800 may correspond to any digital processing system (including intermediate server), which enables an administrator to specify rules, which are later used to identify the specific statements, potentially requiring additional processing. System 800 may also correspond to intermediate server 180, which processes a web page description based on the generated rule set. System 800 is shown containing processing unit (CPU) 810, random access memory (RAM) 820, secondary storage 830, display interface 860, display unit 870, network interface 880 and input interface 890. Each block is described in further detail below.

Display interface 860 provides output signals to display unit 870, which can form the basis for a suitable interface for an administrator to interact with intermediate server 180. For example, the signals sent by display interface 860 may form the basis for generating displays of statement types box 310 and language grammar box 320. Input interface 890 (e.g., interface with a key-board and/or mouse, not shown) enables a user/administrator to provide any necessary inputs to intermediate server 180. For example, the various selections and edits may be performed using input interface 890.

Network interface 880 may enable intermediate server 180 to send and receive data on communication networks using protocols such as IP. While network interface 880 is shown as a single unit for conciseness, it should be understood that network interface may contain multiple units, with each unit potentially implemented using a different protocol. In addition, network interface 880 may be used to send and receive data signals, which form the basis for implementing the interfaces of FIGS. 3A and 4A-4H on an external client system (not shown).

RAM 820 and secondary storage 830 respectively provide volatile (but of low access times) and non-volatile memories. RAM 820 receives instructions and data on path 850 from secondary storage 830, and provides the instructions to processing unit 810 for execution. Secondary storage 830 may contain units such as hard drive 835 and removable storage drive 837. Secondary storage 830 may store the software instructions and data, which enable intermediate server 180 to provide several features in accordance with the present invention.

While secondary storage 830 is shown contained within intermediate server 180, an alternative embodiment may be implemented with the secondary storage implemented external to intermediate server 180, and the software instructions (described below) may be provided using network interface 880.

Some or all of the data and instructions may be provided on removable storage unit 840 (or from a network using protocols such as Internet Protocol), and the data and instructions may be read and provided by removable storage drive 837 to processing unit 810. Floppy drive, magnetic tape drive, CD-ROM drive, DVD Drive, Flash memory, removable memory chip (PCMCIA Card, EPROM) are examples of such removable storage drive 837.

Processing unit 810 may contain one or more processors. Some of the processors can be general-purpose processors, which execute instructions provided from RAM 820. Some can be special purpose processors adapted for specific tasks (e.g., for memory/queue management). The special purpose processors may also be provided instructions from RAM 820.

In general, processing unit 810 reads sequences of instructions from various types of memory medium (including RAM 820, secondary storage 830 and removable storage unit 840), and executes the instructions to provide various features of the present invention. Thus, the embodiment(s) of FIG. 8 can be used to provide several features according to the present invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of enabling a user to identify a plurality of statements potentially requiring modification when received contained in a web page description, said method comprising:
    displaying a language grammar of a statement type on a display, wherein said language grammar and said statement type are defined by a language used to specify said web page description, and wherein said language grammar contains a field name and wherein said field name is also displayed on said display;
    enabling said user to provide a field value associated with said field name on said display;
    generating a rule instance by incorporating said field value associated with said field name into said language grammar, whereby said rule instance contains both said field value and said field name,
    wherein said rule instance identifies at least some of said plurality of statements and wherein said rule instance is compared with a statement later received in said web page description to determine whether the statement requires modification.

2. The method of claim 1, further comprising:
    listing a plurality of statement types including said statement type on said display; and
    providing said user an ability to select said statement type from said plurality of statement types on said display,
    wherein said displaying and said enabling are performed on said display in response to said user selecting said statement type on said display.

3. The method of claim 2, further comprising:
    storing said rule instance in XML format, wherein said rule instance comprises said field name and said field value.

4. The method of claim 2, further comprising:
    receiving said web page description; and
    examining each statement in said web page description to determine whether said statement matches said rule instance,
    wherein said receiving and said examining are performed in an intermediate server.

5. The method of claim 2, further comprising enforcing a constraint when generating said rule instance.

6. The method of claim 5, wherein said constraint comprises ensuring that variable data is entered for a field in said language grammar.

7. The method of claim 2, wherein said language comprises HTML, and said plurality of statement types comprise an attribute statement type, a form statement type, an applet statement type, and a TagText statement type.

8. The method of claim 2, wherein said language comprises JavaScript (JS), and said plurality of statement types comprise a variable statement type and a function statement type.

9. The method of claim 2, wherein said language comprises extended meta language (XML), and said plurality of statement types comprise a TagText statement type and an attribute statement type.

10. The method of claim 2, wherein said listing is performed in a first image screen displayed to said user on said display, and said displaying and said enabling are performed using a second image screen displayed to said user.

11. A computer readable medium carrying one or more sequences of instructions for causing a system to enable a user to identify a plurality of statements potentially requiring modification when received contained in a web page description, wherein execution of said one or more sequences of instructions by one or more processors contained in said system causes said one or more processors to perform the actions of:
    displaying a language grammar of a statement type on a display, wherein said language grammar and said statement type are defined by a language used to specify said web page description, and wherein said language grammar contains a field name and wherein said field name is also displayed on said display;
    enabling said user to provide a field value associated with said field name on said display; and
    generating a rule instance by incorporating said field value associated with said field name into said language grammar, whereby said rule instance contains both said field value and said field name,
    wherein said rule instance identifies at least some of said plurality of statements and wherein said rule instance is compared with a statement later received in said web page description to determine whether the statement requires modification.

12. The computer readable medium of claim 11, further comprising:
    listing a plurality of statement types including said statement type on said display; and
    providing said user an ability to select said statement type from said plurality of statement types on said display,
    wherein said displaying and said enabling are performed in response to said user selecting said statement type.

13. The computer readable medium of claim 12, further comprising:
    storing said rule instance in XML format, wherein said rule instance comprises said field name and said field value.

14. The computer readable medium of claim 12, further comprising:
    receiving said web page description; and
    examining each statement in said web page description to determine whether said statement matches said rule instance,
    wherein said receiving and said examining are performed in an intermediate server.

15. The computer readable medium of claim 11, further comprising enforcing a constraint when generating said rule instance.

16. The computer readable medium of claim 15, wherein said constraint comprises ensuring that variable data is entered for a field in said language grammar.

17. The computer readable medium of claim 12, wherein said language comprises HTML, and said plurality of statement types comprise an attribute statement type, a form statement type, an applet statement type, and a TagText statement type.

18. The computer readable medium of claim 12, wherein said language comprises JavaScript (JS), and said plurality of statement types comprise a variable statement type and a function statement type.

19. The computer readable medium of claim 12, wherein said language comprises extended meta language (XML), and said plurality of statement types comprise a TagText statement type and an attribute statement type.

20. The computer readable medium of claim 12, wherein said listing is performed in a first image screen displayed to said user on said display, and said displaying and said enabling are performed using a second image screen displayed to said user.

21. A system for enabling a user to identify a plurality of statements potentially requiring modification when received contained in a web page description, said system comprising:
   a display interface causing a display on a display unit;
   a first interface sending data representing a language grammar of a statement type, wherein said language grammar and said statement type are defined by a language used to specify said web page description, wherein said display interface includes said language grammar in said display based on said data, wherein said field name is also displayed on said display;
   a second interface receiving data representing a variable data provided as an input associated with said language grammar in said display, wherein said variable data is provided by said user; and
   a processing unit incorporating said variable data into said language grammar to generate a rule instance, whereby said rule instance contains both said field value and said field name,
   wherein said rule instance identifies at least some of said plurality of statements and wherein said rule instance is compared with a statement later received in said web page description to determine whether the statement requires modification.

22. The system of claim 21, wherein said processing unit causes a plurality of statement types including said statement type to be listed in said display and receives a selection data indicating that said user has selected said statement type from said plurality of statement types, wherein said processing unit controls said first interface and said second interface to cause said display to be generated in response to receiving said selection data.

23. The system of claim 22, further comprising a memory storing said rule instance in XML format, wherein said rule instance comprises a field name and a field value, wherein said field value comprises said variable data.

24. The invention of claim 22, wherein said system comprises an intermediate server, said processing unit receiving said web page description and examining each statement in said web page description to determine whether said statement matches said rule instance.

25. The system of claim 24, wherein said processing unit enforces a constraint when generating said rule instance.

26. The system of claim 25, wherein said constraint comprises ensuring that variable data is entered for a field in said language grammar.

27. The system of claim 22, wherein said language comprises HTML, and said plurality of statement types comprise an attribute statement type, a form statement type, an applet statement type, and a TagText statement type.

28. The system of claim 22, wherein said language comprises JavaScript (JS), and said plurality of statement types comprise a variable statement type and a function statement type.

29. The system of claim 22, wherein said language comprises extended meta language (XML), and said plurality of statement types comprise a TagText statement type and an attribute statement type.

30. A method of identifying statements requiring modification when processing web pages, said method being performed in a web server, said method comprising:
   displaying a language grammar of a statement type, wherein said language grammar and said statement type are defined by a language used to specify a web page description;
   enabling a user to incorporate a variable data into said language grammar to generate a rule instance;
   receiving a web page containing a plurality of statements; and
   comparing each of said plurality of statements with said rule instance to determine whether the statement requires modification.

31. The method of claim 30, wherein said displaying and said enabling are performed using a single image screen frame displayed to said user.

* * * * *